May 4, 1937. J. E. GROSS Re. 20,347

LUMINOUS TUBE

Original Filed Nov. 2, 1928

INVENTOR
Joseph E. Gross.
BY Birney Hines
ATTORNEY

Reissued May 4, 1937

Re. 20,347

UNITED STATES PATENT OFFICE 20,347

LUMINOUS TUBE

Joseph E. Gross, Swissvale, Pa., assignor to Aurora Sign Company, a corporation of Pennsylvania Original No. 1,879,740, dated September 27, 1932, Serial No. 316,707, November 2, 1928. Application for reissue September 27, 1934, Serial No. 745,828

18 Claims. (Cl. 176—126)

My invention relates to electrically operated gas filled luminous tubes and more particularly to electrodes for such tubes.

It is the object of my invention, in general to provide a luminous tube that shall be simple and efficient in operation and capable of being readily and economically manufactured and maintained.

A more specific object of my invention is to provide a luminous tube in which a minimum amount of sputtering will occur during its operation.

Another object of my invention is to provide a luminous tube in which the disintegration of the electrodes shall be practically negligible.

It is also an object of my invention to provide a luminous tube that may be operated by a minimum amount of auxiliary apparatus.

Other objects of the invention will, in part, be obvious, and will, in part, appear hereinafter.

For an illustration of one of the various forms of my invention take, reference may be had to the accompanying drawing, in which.

Figure 1:
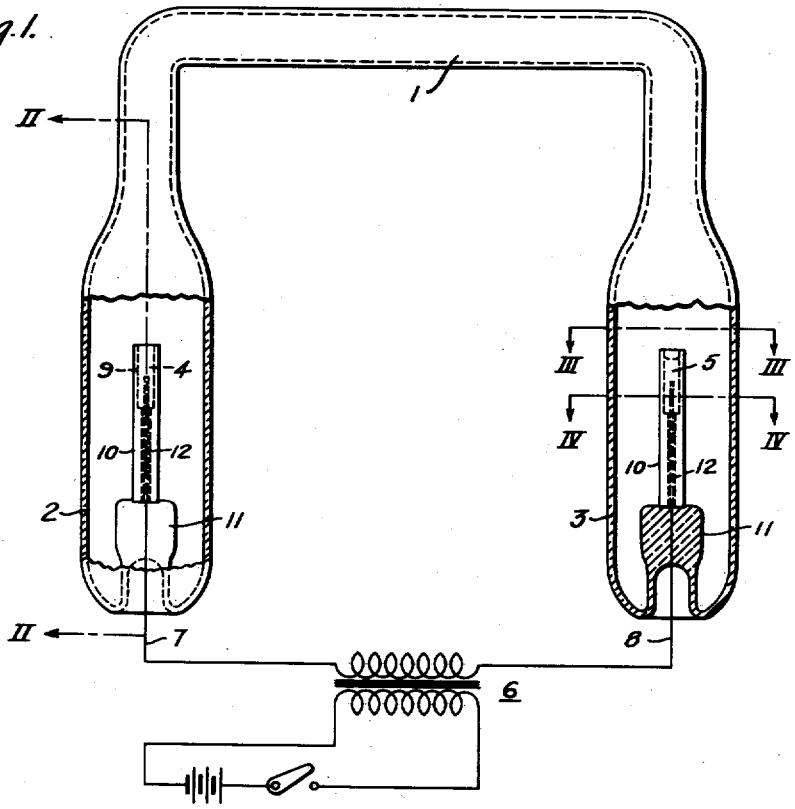
Figure 1 is a top plan view, partially broken away, of a luminous tube embodying my invention.
Figure 2:
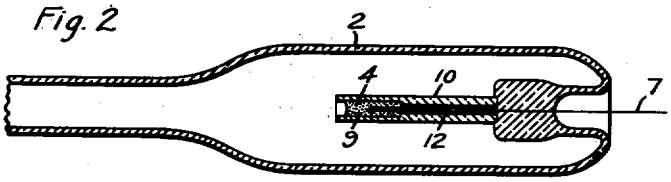
Fig. 2 is a view taken along the line II—II of Fig. 1.
Figure 3:
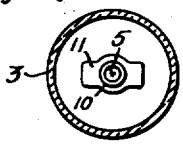
Fig. 3 is a view taken along the line III—III of Fig. 1.
Figure 4:
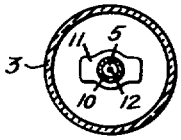
Fig. 4 is a view taken along the line IV—IV of Fig. 1.

In the drawing, I have illustrated a luminous tube as comprising an elongated sealed glass envelope 1 that is adapted to be exhausted of air and gases to a predetermined value and then filled with a predetermined amount of a monatomic gas such as neon, argon or helium.

The glass envelope 1 is provided with enlarged end portions 2 and 3 in which are disposed, respectively, a cathode 4 and an anode 5, both of these electrodes being connected to the secondary circuit of an alternating current transformer 6 by a pair of lead-in wires 7 and 8.

As shown, the cathode 4 is disposed in an elongated cavity 9 in a supporting member 10 of a suitable insulating material, such as porcelain. The porcelain member 10 is mounted on and fused to a glass press 11 that constitutes a part of the glass envelope 1. A conductor 12 that is disposed in a longitudinal aperture in the supporting member 10 serves to connect the cathode 4 to the lead-in wire 7. Conductor 12, as shown, extends into one end of cathode 4 and, in the finished article, is embedded in and fused to the cathode.

It will be noted that the cavity 9 is of such shape and dimensions that the member 10 covers the cathode 4 to such an extent that only a small area of its total surface is exposed and therefore that the member 10 not only acts as a support for the cathode but also serves as an insulating cover or casing to limit or restrict the surface of the cathode that is exposed to the gas with which the lamp may be filled. This provision for covering the cathode by an insulating material to such an extent that only a small portion of its entire surface is exposed is important, in that it limits the area of the cathode from which the electrical discharge may pass when the tube is placed in operation, and therefore conserves the heat in the cathode to such a degree while the tube is being started that it is not necessary to employ a heater for the cathode or a large kindling current. I have found that the exposed area of the electrode should be at least less than one square decimeter per ampere.

I have also found that especially efficient operation of the tube may be obtained by placing the cathode 4 so far within the cavity 9 that the material surrounding the mouth of the cavity provides a restricted passageway for the discharge from the exposed surface of the cathode.

In constructing the cathode 4, I prepare a mixture of a suitable metal, such as nickel, and one or more suitable salts of the alkaline earth metal group, such as barium carbonate and strontium carbonate. While the materials referred to may be employed in various combinations, I prefer to employ a mixture of approximately the following proportions, by weight, nickel 50 percent, barium carbonate 25 percent and strontium carbonate 25 percent. The ingredients are mixed together thoroughly and then tamped into the cavity 9 in the porcelain member 10 and about the end of lead-in conductor 12 until the cavity is filled to within a short distance of its mouth, so that the porcelain around the mouth of the cavity will extend a sufficient distance to constitute a tube or restricted passageway through which any discharge from the cathode must pass.

After the mixture is tamped down in the cavity 9 of the member 10, it is heated until it becomes a sintered mass. Upon completion of the sintering process, the supporting member 10 carrying the cathode 4 and the press 11, upon which it is mounted, are placed in position in the tube and the press is fused to the glass envelope 1.

Any suitable electrode may be employed as the anode 5 in the tube, but I prefer to use an anode constructed in the same manner as the cathode just described, as it simplifies the manufacturing activities necessary to produce a satisfactorily operative tube.

After the anode and cathode have been placed in position in the glass envelope or tube, the tube may be exhausted, filled with gas, and sealed off in the usual manner.

Upon operatively connecting the completed tube to a suitable source of electrical energy, such as the transformer 6, the voltage rises rapidly for a small fraction of a second until the breakdown of the gap between the electrodes occurs. After the breakdown occurs, the voltage drops to a value determined by the size of the tube and the electrodes. Inasmuch as the exposed surface of the cathode 4 is very limited, the discharge is restricted to such a small area that it heats rapidly to such a degree as effects a discharge of electrons from that surface and thereby causes the gas in the tube to become luminous.

By reason of the small exposed area of the cathode and the short period during which the voltage rises, such disintegration of the cathode as occurs in operating the lamp is practically neglible and the life of the tube will not be shortened by an excessive deposit on its interior surface.

As shown, however, the body of the cathode 4 extends within the cavity 9 for such a distance as will insure a supply of active material during the full life of the tube regardless of any disintegration of the small exposed discharge area of the cathode that may take place.

It will therefore be seen that I have provided a luminous tube that is easily manufactured, that is simple in operation and which will have exceptionally long life.

While I have illustrated and described only one specific embodiment of my invention, I realize that it is susceptible of wide application, and I do not desire to be limited to the precise construction illustrated and described.

I claim as my invention:

1. An electron emissive electrode for luminous tubes comprising a lead-in conductor embedded in a sintered mass of nickel, barium oxide and strontium oxide.

2. An electron emissive electrode for luminous tubes comprising a lead-in conductor having one end thereof embedded in a sintered mass of nickel, barium oxide and strontium oxide.

3. An electron emissive electrode for luminous tubes comprising a refractory non-metallic sleeve, a lead-in conductor having an end extending into the sleeve, and a sintered compact mass of nickel, barium oxide and strontium oxide in the sleeve, said mass being fused to the sleeve and lead-in conductor.

4. An electron emissive electrode for luminous tubes comprising a homogeneous mass of approximately the proportions by weight, nickel 50 percent, barium oxide 25 percent and strontium oxide 25 percent.

5. An electrode for luminous tubes utilizable either as a cathode or an anode, said electrode comprising a lead-in conductor, and a homogeneous mass of approximately the proportions by weight, nickel 50 percent, barium oxide 25 percent and strontium oxide 25 percent, said mass being fused to an end portion of the lead-in conductor that extends into the press end of such tubes.

6. The method of making electron emissive electrodes that comprises filling a hollow refractory sleeve with a mixture of nickel, barium carbonate and strontium carbonate, tamping said mixture and then heating the sleeve and mixture to form a sintered mass of nickel, barium oxide and strontium oxide.

7. The method of making electron emissive electrodes that comprises inserting a lead-in conductor into a sleeve, filling a portion of said sleeve with a mixture of nickel, barium carbonate and strontium carbonate, compacting said mixture in the sleeve and about the lead-in conductor, and heating the mixture to form a sintered mass of nickel, barium oxide and strontium oxide.

8. An electron emissive electrode for luminous tubes comprising an elongated cylindrical member consisting of a homogeneous mass of one or more alkaline earths and nickel sintered together and having a lead-in conductor electrically connected to one end thereof and terminating within the sintered mass.

9. An electron emissive electrode for luminous tubes comprising a refractory non-metallic sleeve, a sintered compact mass of one or more alkaline earths and a metal disposed within said sleeve, and a lead-in conductor extending into the sleeve and fused to said mass.

10. An electron emissive electrode for luminous tubes comprising a refractory non-metallic sleeve, a sintered mass of nickel and one or more alkaline earths of the group including barium and strontium, disposed within said sleeve, and a lead-in conductor extending into said sleeve and embedded in and fused to said mass.

11. An electron emissive electrode for luminous tubes comprising a refractory non-metallic sleeve, a lead-in conductor extending into one end of said sleeve, and a sintered mass of nickel and one or more electron emitting oxides of the group including barium and strontium, disposed within said sleeve and in electrical contact with said lead-in conductor.

12. An electron emissive electrode for luminous tubes comprising a refractory sleeve, a lead-in conductor extending into the sleeve, and a sintered mass of nickel and one or more electron emitting oxides of the group including barium and strontium, disposed within said sleeve, said mass being sintered to the sleeve and the lead-in conductor.

13. The method of making an electron emissive electrode for a luminous tube, which consists in introducing a lead-in conductor into a refractory tube, introducing mixture of finely divided nickel and one or more carbonates of the alkaline earth metal group into said refractory tube and in contact with said conductor, and then in sintering such mass.

14. The method of making an electron emissive electrode, which consists in introducing a lead-in conductor into a refractory tube, introducing a mixture of a suitable metal and at least one salt of the alkaline earth group into said tube and in contact with said conductor, and in then subjecting said mixture to a sintering temperature.

15. A method of making an electron emissive electrodes which consists in introducing a mixture of particles of a suitable metal and particles of a carbonate of a metal of the alkaline earth group into a refractory tube and in contact with a lead-in conductor element located within such tube, and then subjecting such mixture to a sintering temperature to sinter the same and to convert such carbonate to an oxide.

16. A method of making an electron emissive electrode, which consists in introducing a mixture of a suitable metal and one or more alkaline earths into a refractory tube and in contact with a lead-in conductor located within such tube, consolidating such mixture within such tube and then heating the mixture to sinter the particles thereof together and to such lead-in element.

17. An electron emissive electrode for luminous tubes, comprising a refractory tube, a lead-in conductor element located therein, and a sintered mass of a suitable metal and at least one alkaline earth located within said tube and in electrical contact with said conductor element.

18. An electron emissive electrode for luminous tubes, comprising a refractory sleeve, a lead-in conductor projecting into said sleeve and a substantially homogeneous, compact, sintered mass located within said sleeve and in contact with a portion of said lead-in conductor located within said sleeve, said mass including as constituents thereof at least one metal and at least one oxide of the earth metals group.

JOSEPH E. GROSS.